United States Patent
Hovell et al.

(10) Patent No.: US 7,660,679 B2
(45) Date of Patent: Feb. 9, 2010

(54) METHOD FOR EVALUATING THE DIFFERENCE BETWEEN THE SITUATION AT A GIVEN MOMENT ON A WORKSITE AND A REFERENCE STATE FOR THE OPERATING CONDITIONS FOR TIRES OF CIVIL ENGINEERING VEHICLES ON THE SITE

(75) Inventors: Chad Hovell, Perth (AU); Frédéric Fourie, Clermont-Ferrand (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 166 days.

(21) Appl. No.: 11/484,686

(22) Filed: Jul. 12, 2006

(65) Prior Publication Data
US 2007/0150210 A1    Jun. 28, 2007

Related U.S. Application Data

(63) Continuation of application No. PCT/EP2005/000129, filed on Jan. 10, 2005.

(30) Foreign Application Priority Data
Jan. 12, 2004    (FR) .................................. 04 00253

(51) Int. Cl.
G01B 3/44  (2006.01)
G01B 3/52  (2006.01)

(52) U.S. Cl. ...................................................... 702/34

(58) Field of Classification Search ............. 702/33–35, 702/179–181, 81, 84, 182–185, 189, 193, 702/194, 199; 73/8, 146; 701/74, 80; 700/108–110, 700/174, 175
See application file for complete search history.

(56) References Cited

U.S. PATENT DOCUMENTS

| | | | |
|---|---|---|---|
| 5,827,957 A * | 10/1998 | Wehinger | 73/146.3 |
| 5,913,917 A | 6/1999 | Murphy | |
| 6,212,947 B1 * | 4/2001 | Shimizu et al. | 73/146 |
| 6,518,875 B2 * | 2/2003 | DeZorzi | 340/442 |
| 7,049,949 B2 * | 5/2006 | Champeau | 340/442 |
| 2005/0080777 A1 | 4/2005 | Champeau | |
| 2005/0085987 A1 * | 4/2005 | Yokota et al. | 701/80 |

* cited by examiner

*Primary Examiner*—Michael P Nghiem
(74) *Attorney, Agent, or Firm*—Buchanan Ingersoll & Rooney PC

(57) ABSTRACT

A method for evaluating the difference between the situation on a site at a given moment and a reference state in regards to the operating conditions of tires of heavy vehicles of the civil engineering type, wherein a user determines at least one zone on the site and determines n parameters which are characteristic of the operating conditions for tires in the zone. The user allocates to each parameter a variance dimension ($x_i$) and enters this dimension in a processor capable of performing an automatic consolidation I of the dimensions of the n parameters. The processor performs a consolidation of the dimensions of the n parameters to give I, the variance dimension index for the zone.

19 Claims, 2 Drawing Sheets

Fig. 2  Zone comprising tracks used for transport

| Mine | Bolinden | Operating company | A | Type of vehicle | Cat 785 |
| Material transported | coal | Assistant | B | Size of tyres | 33 00 R 31 |
| Track | 10 | Date of visit | 28/11/2003 | Type of rubber compound | XDR 4 |
| | | Date of previous visit | 15/10/2003 | | |

| Parameter | Choice | 1 | 2 | 3 | 4 | 5 | Comments |
|---|---|---|---|---|---|---|---|
| Presence of stones | Presence of stones on the track which can be avoided and do not cause significant damage to the tyres if they are driven over | | | x | | | Significant improvement |
| Convexity of track | The convexity of the track is sound and well maintained | | | | x | | None |
| Gradient of track | Gradient of 8%, uphill or downhill with load | | | x | | | Track variation is temporary |
| Incline (camber) | The incline of the track, the speed of the vehicle and the radius of turns are correct | | | | x | | None |
| Aggregates | Aggregates are visible and cover more than 30% of the track | | | | x | | None |
| Undulations | Large undulations which cannot be avoided, due to stones, cause flexing and load shifts, both empty and laden | | x | | | | No improvement |
| Bends through 180° | Bends through 180° have no effect on the tyre | | | | x | | None |
| Hardness | Medium conditions: ground is unstable where there are areas of deep mud which may cause skidding, incisions in the sidewall, tearing of tread of tyres | | | x | | | Improvement |
| Water | Water is present and cannot be avoided, but has no effect on industrial vehicles | | | | x | | Fall in water levels observed |

Deviation index: $I\%$

| Previous | 47% |
| Current | 69% |

Potential for improvement PA

| Previous | 27% |
| Current | 13% |

| very poor | poor | medium | good | excellent |
|---|---|---|---|---|
| | | | Δ | |

GOOD

Comments on zone: main area of improvement removal of undulations in the track

METHOD FOR EVALUATING THE DIFFERENCE BETWEEN THE SITUATION AT A GIVEN MOMENT ON A WORKSITE AND A REFERENCE STATE FOR THE OPERATING CONDITIONS FOR TIRES OF CIVIL ENGINEERING VEHICLES ON THE SITE

This application is a continuation of International Application No. PCT/EP2005/000129 filed on Jan. 10, 2005 and which published under WO 2005/066855 on Jul. 21, 2005.

BACKGROUND

The present invention relates to the technical field of tires, in particular tires of civil engineering vehicles and the like (in the sector of intensive agriculture, vehicles operating in ports, and the like), and more generally at all sites where such heavy vehicles operates in conditions which are stable or at least stable for a sufficient period (for example, on a single site there may be a period of stable conditions in a "dry season" and other stable conditions in a "rainy season", and the like); to be more precise, the invention relates to a method for evaluating the difference between the situation of a site at a given moment and a reference or normal state as regards the operating conditions of such tires over a period of time corresponding to stable operating conditions.

Tires for construction and other, similar vehicles represent a considerable cost for the operating companies of sites such as surface mines, civil engineering and similar operations. The cost of tires may come to up to 20% of the operating costs. The rough cost of large tires of this kind is in the order, depending on the item of plant and its size, of €8000 (for a 33.00R51; 38-tonne load-carrying capacity for each tire) to €25000 (for a 59/80 R 63, with 100-tonne capacity) for each tire.

For a surface mine, which is the example application most representative of the applications of the invention, depending on the size the cost of tires may be €5 to 10 million or even €15 million per year, based on vehicles equipped with six tires and complete replacement of the vehicle tires after one year.

It will readily be appreciated, therefore, that operating companies take considerable note of the service life of these tires.

It will also readily be appreciated that if the tires do not last as long as the anticipated service life, there is an urgent need for the operating company, given its profitability targets, to remedy the problem. This is all the more true since, in addition to the cost of the tires, the profitability calculations for the site are affected by the fact that heavy vehicles are rendered immobile when they should not be.

Moreover, the tire manufacturer's interests tend in the same direction, that is to seek to understand the cause of premature tire degradation so that its manufacturing is not implicated.

Despite the vast economic stakes for both the operating company of a site and the manufacturer, there has not hitherto been any method allowing the causes of premature tire degradation to be understood and analyzed. People make do with empirical examinations and replacing tires (of which we have already seen the cost), both measures which do not allow any solution to be found.

There is thus a major need, even though this does not seem to have been recognized in the prior art, or has been considered impossible to meet at reasonable cost, for a process allowing abnormal degradation in a tire of a civil engineering vehicle or the like to be attributed to objective causes relating to the characteristics of the site at which the vehicles operate.

SUMMARY OF PREFERRED EMBODIMENT

The invention relates to a method for evaluating the difference between the situation on a site at a given moment and a reference state (also called a normal state) as regards the operating conditions of tires of heavy vehicles of the civil engineering type or the like at this site, in which:

a user determines at least one zone on the site;

the user determines n parameters which are characteristic of the operating conditions for tires in the zone;

the user allocates to each parameter a variance dimension ($x_i$) and enters this dimension in a device capable of performing an automatic consolidation I of the dimensions of the n parameters; and the device performs a consolidation of the dimensions of the n parameters to give I, the variance dimension index for the zone.

The term reference or normal state for a zone on a site is used here to mean the state in which the operating conditions for tires meet conditions for which the tires were designed. In that case, the tires can provide their users with the expected service and service life.

In accordance with a preferred embodiment of the method according to the invention, the parameters characteristic of operation of the tires fall within the following group:

parameters characteristic of the topography of the circuits followed by the vehicles;

parameters characteristic of the conditions of contact between the tires and the circuits; and parameters characteristic of the conditions in which the vehicles are used.

Preferably, the parameters characteristic of the topography of the circuits fall in particular within the following group:

the convexity of the surface on the tracks of the circuit;

the incline of the tracks of the circuit (gradient);

the incline of the bends on the tracks of the circuit (camber); and significant undulations in the surface of the tracks of the circuit.

Preferably, the parameters characteristic of the conditions in which the vehicles are used in the circuits fall in particular within the following group:

bends through 180° and U turns; and steering angle in a zone in which materials are loaded or unloaded.

Advantageously, the parameters characteristic of the conditions of contact between the tires and the tracks of the circuit fall in particular within the following group:

hardness of the surface;

presence of aggregates;

presence of stones;

accidental shedding of stones;

presence of dangerous protuberances; and presence of water.

The device preferably performs an arithmetic averaging of the variance dimensions of the n parameters, to give:

$$I = \frac{1}{n}\sum_{i=1}^{n} x_i$$

The device may also perform an arithmetic averaging of the variance dimensions with weighting by weighting factors ($f_i$) specified for each of the n parameters, to give:

$$I = \frac{\sum_{i=1}^{n} x_i f_i}{\sum_{i=1}^{n} f_i}$$

The weighting factors ($f_i$) may be between 0.1 and 3, preferably between 0.5 and 2.

Each parameter of a zone may have a scale of values between 1 and m, with 1 preferably corresponding to poor operating conditions and m corresponding to reference operating conditions for the tires.

The device may also advantageously standardize the consolidation value of a given zone with respect to a theoretical reference situation $I_{th}$, as follows:

$$I_{th} = \frac{\sum_{i=1}^{n} m f_i}{\sum_{i=1}^{n} f_i} \text{ to arrive at } I_{\%} = \frac{I}{I_{th}} \times 100 = \frac{\sum_{i=1}^{n} x_i f_i}{\sum_{i=1}^{n} m f_i} \times 100$$

In accordance with another particular embodiment of the method according to the invention, moreover:

for at least one delimited zone on the site and for at least one of the given n parameters, the device is supplied with a reduced variance dimension ($\Delta x_i$) between the conditions at a given moment and the reference operating conditions of the tires for that parameter in that zone; and the device performs a consolidation of the reduced variance dimensions of the n parameters of the zone and arrives at PA, the index of potential reduction in variance dimension in the zone, and/or $PA_{\%}$, the relative index of potential reduction in variance dimension in the zone (also referred to as the potential for improvement), to give:

$$PA = \frac{\sum_{i=1}^{n} \Delta x_i f_i}{\sum_{i=1}^{n} f} \text{ or } PA_{\%} = \frac{PA}{PA_{th}} = \frac{\sum_{i=1}^{n} \Delta x_i f_i}{\sum_{i=1}^{n} m f_i} \times 100$$

This step allows identification of the zones and the points where the impact on the variance dimension index will be the greatest.

Preferably, the device also calculates the following:

for each parameter in a zone, the potential variance dimension ($x_{iA} = x_i + \Delta x_i$) corresponding to the expected state of the parameter after application of the evaluated improvements; and the device consolidates the expected variance dimensions, which may be weighted by weighting factors, to arrive at $I_A$, the index of potential variance dimension in the zone.

This index $I_A$ allows the impact of the potential for a reduction in the variance, if applied, on the variance dimension index of the zone in question to be shown.

Once the various measurements of the method according to the invention have been collated and summarized, they will reveal the problematic zones and allow corrective measures to be defined and recommended, in cooperation with the staff at the site in question.

These recommendations may also relate to the choice and operating conditions of the types of tires for the vehicles; they may also refer to the types and/or operating conditions of the vehicles and plant at the site.

The device may also advantageously perform an additional step of comparing the indices of variance dimension and/or potential for improvement obtained with the indices and/or potentials obtained for the same zone during a previous evaluation.

The steps of comparison with a previous measurement allow the improvements obtained as a result of implementing one or another recommendation to be shown. To be reliable, these steps require periods which are as "stable" as possible, that is to say periods in which a plurality of measurements or evaluations, and calculations using the method according to the invention, can be performed without the resulting being falsified by changes in the conditions: it is then possible to attribute the differences found substantially to the improvements made.

The method according to the invention may advantageously include steps of generating the data obtained on a presentation medium. A medium of this kind may be for example a computer screen, printing on paper, or transmission by any means to or from a remote site.

The remote site may in particular be a central or regional database where all the results of sites which have undergone the method are stored, including the recommendations for improvements made and the actual improvements found and any other information allowing an operating company on site to search the database for the best parameters to consider or to validate its choices of parameters.

The data generated on the presentation medium may in particular be selected from the following:

identification of the site by its principal parameters;
identification of the tires in question;
for each zone, display of the parameters selected and the variance dimensions attributed to each of these parameters;
for each zone, display of the variance dimension index and/or the potential for reduced variance dimension and, where appropriate, values obtained from previous measurements;
comments on each parameter of each zone;
recommended actions for each parameter of each zone; and
a visual or alphanumeric display of the change in the variance dimension index when the potential for reduced variance dimension is applied.

The invention also relates to a device for implementing the method according to the invention, including:

at least one access to data to be processed;
at least one calculator unit allowing the indices and/or potentials to be calculated; and
operating instructions allowing the method to be performed.

This device is preferably suitable for cooperating with a means for presenting the results.

The invention also relates to a computer system comprising the device mentioned above.

The invention also relates to software comprising elements of code programmed for implementation of the method according to the invention when the said software is installed in a computer system and executed by the computer system.

The invention also includes software in the form of a product recorded on a medium which may be read by a computer system, comprising elements of code programmed in accordance with the method according to the invention.

BRIEF DESCRIPTION OF THE DRAWINGS

Other features and advantages of the invention will be better understood from reading the description which follows and which refers to the attached drawing, in which:

FIG. 2 shows an example of a screen showing the variance dimension index for a zone, in this case the tracks used for transport, its potential for improvement, and the comparison with the values obtained during a previous evaluation.

DESCRIPTION OF A PREFERRED EMBODIMENT

Figure 1:
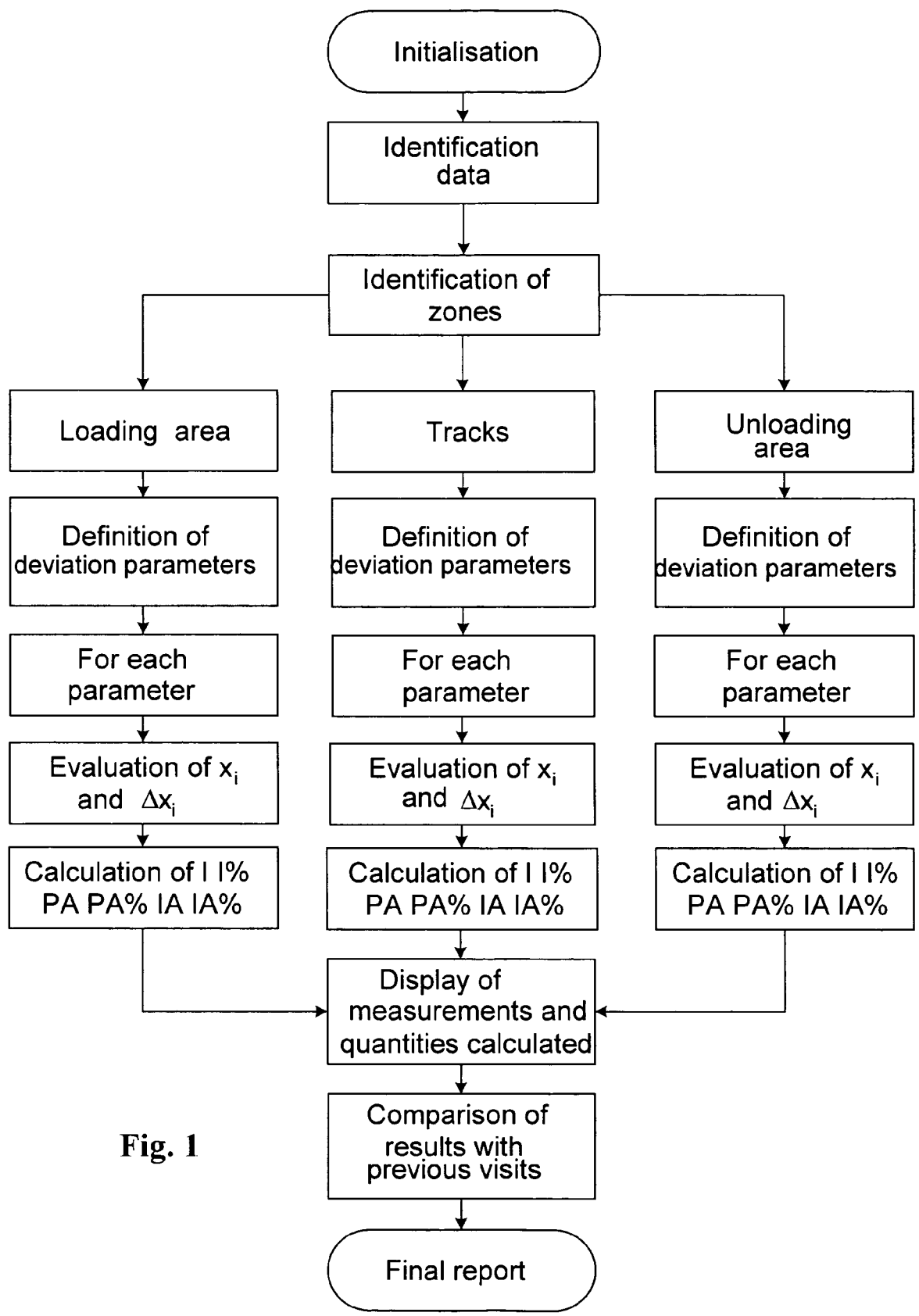
FIG. 1 shows a flow diagram of the steps of the method according to the invention.

The example below represents a simulation of implementation of the method according to the invention in a surface mining operation. This implementation may readily be carried out using software installed on a laptop computer.

FIG. 1 shows a flow diagram of the various steps of the method according to the invention.

After the software has been initialized, the user enters identification data, such as:

identification of the site in question by its principal parameters, such as the name of the mine, the material transported, identification of the track used for transport, the distance covered by the vehicles in one cycle;

identification of the type of vehicle, the size of the tires, the type of rubber compound on the tread of the tires;

identification of the user and the site representative;

the date of the evaluation and the date of the previous evaluation.

Then, unless this has already been done, the user delimits and defines one or more zones on the site in which the characteristics of the site and in particular the characteristics of operation of the tires are substantially uniform and stable. Usually, the user selects at least three zones:

an area where the vehicles are loaded;

the tracks used for transport;

an area where the vehicles are unloaded.

Then, for each zone, the user determines the parameters or objective criteria which have an impact on the service life of the tires, through the physical effects of these parameters or criteria on the tire itself (direct effect) or on the vehicle (with an indirect effect on the tire).

In the case of the area where the vehicles are loaded (zone 1), the user may define the following variance parameters:

Topography of the Loading Area significant undulations in the surface: undulations in the ground in the loading or working area have a major influence on load on the vehicle or plant (vibrations) and hence on the amplitude of deflections undergone by the tires; this criterion will come up again for the other two zones;

Conditions of Contact Between the Tire and the Surface presence of stones in the loading area: the presence of stones or materials in the loading area may cause considerable damage to the tires;

presence of stones at the point of loading materials: the attempt is made to evaluate how clean the point of loading is (presence of stones), and whether or not the vehicles have to reverse into the materials to be loaded;

hardness of the surface: the hardness of the ground has an influence on the area of contact between the tires and the ground; unstable or "soft" ground may cause skidding, incisions in the sidewall of tires, damage to the tread or even tears therein;

presence of water: an inundated zone may hide stones or rubbish on the ground; this may be a seasonal phenomenon.

Conditions of Use of the Vehicles steering angle of heavy vehicles: the steering angle has an effect on the service life of tires: in fact, the possibility of damage is exacerbated by tight turning angles; if the vehicles are able to maneuver onto the loading area and at the point of loading with large steering angles, this risk is reduced.

For each variance parameter it is desirable, to make it easier to evaluate, if a scale is defined, for example, with values from 1 to 5 (where 1 is the most abnormal condition or situation for the tires and 5 is the reference condition for operation of the tires). In the tables below, scales are explained by describing specific conditions which are closer or further away from normal conditions for the tires with a few descriptive phrases.

The tables below illustrate a scale proposed for the variance factors, for each of the six parameters mentioned above (with value number 5 being the reference condition for which the tires were designed).

Parameter: Presence of Stones in the Zone

| x | Illustrations |
|---|---|
| 1 | Broad zone covered with stones which cannot be avoided and may cause significant damage to the tires |
| 2 | Significant number of stones which cannot be avoided and may cause significant damage to the tires |
| 3 | Presence of stones on the track which can be avoided but which do not cause significant damage to the tires if they are driven over |
| 4 | Very small, very localized stones |
| 5 | No stones tipped accidentally onto the track |

Parameter: Presence of Stones at the Point of Loading Materials

| x | Illustrations |
|---|---|
| 1 | Excessive heaps of stones and rubbish are formed; for loading, the vehicles have to reverse into the materials; damage to tires is inevitable |
| 2 | Considerable heaps of stones and rubbish are formed; for loading, the vehicles have to reverse into the materials; damage to tires is inevitable |
| 3 | Stones and rubbish can be avoided; for loading, the vehicles have to reverse into the materials; damage to tires is a possibility |
| 4 | Few or no stones, little or no rubbish; the stones and rubbish can be avoided; there is no need to reverse into the materials |
| 5 | No stones or rubbish; there is no need to reverse into the materials for the purpose of loading |

Parameter: Steering Angle

| x | Illustrations |
|---|---|
| 1 | Turns in the loading zone are taken at high speed with the vehicle on maximum lock, so that considerable shifts in load arise |
| 2 | Turns in the loading zone are taken at high speed with the vehicle close to maximum lock, so that shifts in load arise |
| 3 | Turns in the loading zone are taken at medium speed, and the wheels of the vehicle are not tightly turned; vehicles arriving empty make only small turns |

-continued

| x | Illustrations |
|---|---|
| 4 | Turns in the loading zone are taken at low speed, and the wheels of the vehicle are not tightly turned; vehicles arriving empty make only small turns |
| 5 | Turns in the loading zone are taken at the correct speed, and the wheels of the vehicle are not tightly turned; vehicles arriving empty travel in a straight line |

Parameter: Undulations in the Surface

| x | Illustrations |
|---|---|
| 1 | Large undulations which cannot be avoided, due to stones, cause bouncing, flexing and load shifts, both empty and laden |
| 2 | Large undulations which cannot be avoided, due to stones, cause flexing and load shifts, both empty and laden |
| 3 | Small undulations cannot be avoided, due to stones, cause flexing and load shifts, both empty and laden |
| 4 | Undulations are present but have little or no effect on the tires |
| 5 | No undulations |

Parameter: Hardness of Surface

| x | Illustrations |
|---|---|
| 1 | Extreme conditions: ground is unstable where areas of deep mud which cannot be avoided cause skidding, incisions in the sidewall, tearing of tread of tires |
| 2 | Poor conditions: ground is unstable where areas of deep mud cause skidding, incisions in the sidewall, tearing of tread of tires |
| 3 | Medium conditions: ground is unstable where there are areas of deep mud which may cause skidding, incisions in the sidewall, tearing of tread of tires |
| 4 | Conditions of the ground have little or no effect on the area of contact with the tires |
| 5 | Excellent ground conditions that have no effect on the area of contact |

Parameter: Presence of Water

| x | Illustrations |
|---|---|
| 1 | Very deep water; only heavy plant or industrial vehicles can pass through, depth of one meter or more |
| 2 | Deep water; plant and vehicles have difficulty in passing through, more than 500 mm deep |
| 3 | Water deep enough to hide objects or stones which may cause damage to tires; more than 100 mm deep |
| 4 | Water is present and cannot be avoided, but has no effect on industrial vehicles |
| 5 | No sign of water other than the sprinkling carried out to suppress dust |

In the case of the zone of the tracks used for transport, the same parameters as before can be used, namely the presence of stones in the zone, undulations in the surface, hardness of the surface and the presence of water. However, it is desirable to add the five parameters below:

Topography of Track convexity of the surface of the track: too convex a surface creates significant radial forces affecting the tires.

gradient: it has also been shown that the gradient has a major effect on the service life of tires: traveling laden and uphill over a gradient of 10% can reduce the service life by 19%; a gradient of 12% can bring about a reduction in the service life of as much as 36%; traveling laden and downhill over a gradient of 8% can reduce the service life of the tire by 39%; going downhill, a gradient of 10% can bring about a reduction in the service life of 56%.

incline of the bends on the tracks (camber): the incline or camber may be considerable in the case of bends or U-turn points: the angle of incline, the radius of turning and the speed of the vehicle are the determining factors.

Conditions of Contact between the Tire and the Tracks aggregates: the presence and quantity of aggregates cannot always be evaluated or measured, depending on how visible they are (for example in the presence of water or dust); in good visibility conditions, it is desirable for aggregates not to be visible; above a certain size, for example 25 mm in "diameter", they will be similar to stones that have fallen accidentally.

Conditions of Use of Vehicles bend through 180° or U turn: very tight turns of this kind may cause shifts in loads or overloading, which have an effect on the tire.

The tables below provide illustrations of a proposed scale for the variance factors, for the five parameters mentioned above.

Parameter: Convexity of the Surface of the Track

| X | Illustrations |
|---|---|
| 1 | The convexity of the track causes significant shifts in load |
| 2 | The convexity of the track causes significant shifts in load at certain points |
| 3 | The convexity of the track is less than 3 degrees |
| 4 | The convexity of the track is sound and well maintained |
| 5 | The convexity of the track is excellent throughout the length of the track |

Parameter: Gradient

| x | Illustrations |
|---|---|
| 1 | Gradient of more than 10%, or 8% in the case of going downhill with load |
| 2 | Gradient between 8% and 10%, uphill or downhill with load |
| 3 | Gradient of 8%, uphill or downhill with load |
| 4 | Gradient less than 8%, uphill or downhill with load |
| 5 | Gradient significantly less than 8%, uphill or downhill with load |

Parameter: Incline (Camber)

| x | Illustrations |
|---|---|
| 1 | No incline of the track, tight turns with vehicle at high speed |
| 2 | Slight incline of the track, turns made over small radius with vehicle at high speed |
| 3 | Moderate incline of the track, turns made over moderate radius with vehicle at medium speed |
| 4 | The incline of the track, the radius of turns and the speed of the vehicle are correct |
| 5 | The incline of the track and the radius of turns are correct; the speed of the vehicle is well suited to these conditions |

Parameter: Aggregates

| x | Illustrations |
|---|---|
| 1 | Aggregates are visible and cover the whole track |
| 2 | Aggregates are visible and cover more than 70% of the track |
| 3 | Aggregates are visible and cover more than 50% of the track |
| 4 | Aggregates are visible and cover more than 30% of the track |
| 5 | Aggregates are not visible |

Parameter: Bends through 180° or U Turns

| x | Illustrations |
|---|---|
| 1 | Bends through 180° may cause shifts in load or significant overloading |
| 2 | Bends through 180° may cause shifts in load or undesirable overloading |
| 3 | Bends through 180° may cause limited shifts in load or overloading |
| 4 | Bends through 180° have no effect on the tire |
| 5 | There are no bends through 180° |

In the case of the zone where materials are unloaded, the six parameters of variance selected for the zone where materials are loaded may be retained. However, it is possible to add the following parameter, if needed:

Conditions of Contact between the Tires and the Tracks presence of dangerous protuberances: in the zone with the crusher, there may be ferrous elements in the concrete to reinforce it, or the concrete may have sharp corners.

The table below illustrates a scale proposed for the variance factor, for this parameter.

Parameter: presence of dangerous protuberances

| x | Illustrations |
|---|---|
| 1 | Sharp protuberances which cannot be avoided and which may cause significant fractures or penetrations into tires driving over them |
| 2 | Sharp protuberances which cannot be avoided and which may cause fractures or penetrations into tires driving over them |
| 3 | Sharp protuberances which can be avoided and which may cause fractures or penetrations into tires driving over them |
| 4 | Protuberances which are visible and can be avoided, and which the driver avoids |
| 5 | No protuberances or sharp corners |

It is quite clear that those skilled in the art will be able to select more or fewer zones of interest, more or fewer parameters for each zone, a more or less comprehensive scale, and factors characteristic of the variance for each parameter which are different or derived from those cited in this non-restrictive example. Similarly, the zones, parameters and criteria will need to be adapted if other types of site are to be evaluated, for example maneuvering in port zones, the maintenance of runways at an airport, maneuvering in a chemical industry zone, etc. Adaptations of this kind will be clear to those skilled in the art and do not depart from the scope of the present invention.

The person performing the method according to the invention will use the scales of variance parameters described above, in the presence of a representative of the site, to evaluate the variance dimension values $x_i$ for each parameter and for each zone, for the site in question.

Preferably, they will also evaluate the values $\Delta x_i$ corresponding to the potential for improvement which can be envisaged for the parameter in question.

Once the variance factors have been evaluated for each of the parameters and this data has been entered into the device, the latter calculates the variance index I for each zone, the relative variance index $I_{\%}$ and the potential for improvement PA and/or $PA_{\%}$. The device can also calculate the impact on the variance index of the potentials for improvement which are evaluated: $I_A$ or $I_{A\%}$ (relative index of potential variance dimension after the program of improvements envisaged is implemented).

The software then presents a summary screen showing all these results, as shown for example in FIG. 2. It then draws up the final report.

The various measurements are collated and summarized. They bring out the problematic zones and allow corrective measures to be implemented.

FIG. 2 gives an example of a summary report of a zone which may be obtained using the method according to the invention. The zone in question is a zone comprising tracks.

The identification data is shown at the top of the sheet.

Then a table brings together the variance parameters for the zone, with their selected variance factors. The variance factors are shown in the form of a value (on a scale from 1 to 5) accompanied by the corresponding explanatory phrase. The person performing the operation can also add comments.

Here, the values obtained are 2 for the parameter of undulations, 3 for the parameters of presence of stones and gradient, and 4 for the parameters of convexity, incline, aggregates, bends through 180° and water.

Taking all the weighting factors for the parameters as 1, we arrive at a value for the variance index given by:

$$I = \frac{\sum_{i=1}^{n} x_i f_i}{\sum_{i=1}^{n} f_i}$$

$$I = \frac{\sum_{i=1}^{n} x_i f_i}{\sum_{i=1}^{n} f_i}, \text{ or in this case } I = 31/9 = 3.4; \text{ and}$$

$$I_{\%} = \frac{I}{I_{th}} \times 100 = \frac{\sum_{i=1}^{n} x_i f_i}{\sum_{i=1}^{n} m f_i} \times 100, \text{ here } I_{\%} = 31/45 \times 100 = 69\%$$

The potential for improvement for each parameter does not appear in FIG. 2. The values for $\Delta x_i$ were as follows:

| | | |
|---|---|---|
| Presence of stones | 1 | |
| Convexity | 0 | |
| Gradient | 1 | End of variations in the track |
| Incline | 0 | |
| Aggregates | 0 | |
| Undulations | 3 | Major improvement provided for |
| Bends through 180° | 0 | |
| Hardness | 1 | |
| Water | 0 | |

These values for $\Delta x_i$ are values evaluated by taking into account the concrete possibilities. for improvement in the variance parameter in question, whether by modifying the conditions in which the vehicles are used, by maintaining the tracks, or indeed by modifying the types of tire used. For example, if the site is in a humid tropical zone, there will be very little opportunity for improvement as regards the presence of water. On the other hand, a parameter such as "presence of stones" may be influenced by a considerable potential for improvement if the fact that stones are shed in the working zone of the vehicles is due simply to a lack of instructions or precautions which could be implemented easily and at low cost. Similarly, a parameter such as "protuberances" may be given a low or very low value for $\Delta x_i$ if the site has no resources necessary for the arrangements which have to be made, or a very high one, for example 2 or 3 or 4 if the site has a budget and arrangements are therefore possible.

If we apply the following formula, we arrive at:

$$PA = \frac{\sum_{i=1}^{n} \Delta x_i f_i}{\sum_{i=1}^{n} f},$$

here PA=6/9=0.67, or as a relative value: PA$_\%$=6/45× 100=13%.

In FIG. 2, it is apparent that the variance dimension index I is also shown graphically by a scale of ranges. This presentation is complementary, since, just as precise values are required for the calculation, it is not generally necessary to provide a numerical value to display and summarize the overall value or "variance dimension index" of the zone.

In this simulation, it has been decided to provide a screen which for each zone includes, as well as the parameters and a table of variance factors for these parameters, a colored graphical representation with five ranges of quality levels on the site:

"very poor" "poor" "medium" "good" "excellent"

"Very poor" thus corresponds to a condition of the zone in question which results in very pronounced tire degradation. Of course, a scale from 1 to 5 could have been chosen, and so on.

In the present case, the screen includes a movable pointer which adopts a position as a function of the value obtained by the calculation, in this case 3.4, which corresponds to "good" on the screen on a scale of up to 5, with a value of 3.4 corresponding substantially to 69%.

This way of presenting the information allows the principal problem for the tires in this zone to be identified immediately, namely that of undulations. In agreement with the staff on the site, a proposal may be made to use vehicles such as earth-moving equipment, to bring about a marked improvement in this parameter. This is why a possible potential improvement in this parameter has been scored at 3.

The operating company then carries out these operations for each of the zones on the site. It is clear that this step may be carried out in a successive arrangement, that is to say a complete study being made of each zone followed by passing on to another zone, or in an overlapping arrangement, that is to say with a study of each zone at each step.

The aim of the invention is in fact not only to research the causes of tire degradation on a given site, but also to propose remedies. It is therefore important to have a "potential for improvement" for each zone in question so that efforts can be made (efforts relating to infrastructure, repairs, maintenance, etc.) in the zone or zones having the greatest potential, that is to say in which an improvement will result in the greatest impact on the service life of the tire at the same cost.

At the time of the next visit, a comparison made between the variance dimension indices will allow a check of whether the recommendations have had the anticipated impact, and what potential still exists.

Comparison with the index obtained during the previous study of the same site. This step (which is technically very simple) is important, although it is optional, since it allows a check of whether the recommendations given to the person in charge of the site at the time of the previous visit or visits led to the anticipated improvements.

For this comparison to be meaningful, it is of course necessary for the only significant modification to be attributable to the improvement work. Therefore, other parameters (amount of rainfall, dust, etc.) have to be stable over the period in question and incidents (upsetting a truck full of ore over the track) must not have impaired this stability.

The method enables a dynamic correlation between one visit or measurement and the next and/or in respect of the potential at the site. The steps of comparing with a previous measurement allow the improvements obtained by implementing this or that recommendation to be shown. To be reliable, these steps need periods which are as "stable" as possible, that is to say periods in which a plurality of measurements or evaluations, and calculations using the method according to the invention, can be made without falsifying the results as a result of a change to the conditions: in that case, the differences found can be substantially attributed to the improvements carried out.

The method allows an improvement to be made in the recommendation of tires by taking into account external but unavoidable factors at the site where the vehicles are in circulation.

For example, in a site with three zones, and taking as a hypothesis that two zones have considerable potential and the third less so, it will be possible to recommend arrangements on the site for the two zones with considerable potential and to recommend one more changes to the type of tire for the third, these tires being better adapted to the conditions of use.

The invention also makes it possible, using the same type of database and calculation, where appropriate to recommend a change in the way the road maintenance vehicles, such as earth-moving equipment, are used.

Recommendation of Tires:

Those skilled in the art will have appreciated that the parameters used above, as well as the weighting factors, are a function of the tire used on the site (type, structure, rubber compound, shape of the tread, etc.). The user will thus preferably create an integrated database correlating each type of tire, rubber compound, etc. with each of the variance parameters (for example, the effect of increasing the hardness of the rubber compound on the parameters, the operating pressure, and the like).

A computer calculation then simply allows the impact of the choice of one or another tire on the variance index of a zone, and its potential, to be shown.

For example, on a site with three zones as in this example, and taking as a hypothesis that two zones have considerable potential and the third less so, it will be possible to recommend arrangements on the site for the two zones with considerable potential and to recommend in addition a change in the type of tire, if a new type increases the potential of the third zone (without impairing the indices of variance dimension and potential of the other two, of course).

Recommendation of Vehicles or Plant:

The invention makes it possible, using the same type of database and calculation, where appropriate to recommend a change in plant or a vehicle. This will only be possible when the equipment is replaced.

The invention gives the following advantages:

premature degradation of a tire is attributed to the proper causes;

recommendations are made for improvements to the site (or for a change in the type of tire);

using measurements which recur over a "stable" time period, trends are compared (for example from month to month), such as:

changes in the cost of tires for the period;
changes in the variance dimension index of the zone;
changes to the potential of the zone;
any change in climatic conditions (presence or absence of rainwater, etc.);
any unforeseen events (accidental shedding of loads, damage to a road surface, etc.);

in order to allow all this information to be correlated and to enable the operating company at the site to define a diagnostic and to decide, in cooperation with the staff at the site, on improvements to be made and the timetable for their implementation.

The invention also relates to all those embodiments and applications which will be readily accessible to those skilled in the art on reading the present application, from their own knowledge, and where appropriate from simple routine tests.

What is claimed is:

1. A method for evaluating the operating state of heavy duty tires of civil engineering vehicles at a site to determine the effect thereof on tire service life, comprising the steps of:
   A) selecting a zone of the site;
   B) selecting n parameters relating to respective tire operating conditions in the zone which affect the service life of the heavy duty tires of civil engineering vehicles;
   C) allocating to each parameter a variance dimension which is characteristic of a degree to which the effect on tire service life of the respective operating condition varies from the effect on tire service life of a reference operating condition for which the tires were designed;
   D) entering into a processor each variance dimension allocated in step C;
   E) causing the processor to consolidate the variance dimensions entered in step D and provide therefrom a variance dimension index I for the zone.

2. A method according to claim 1, in which the n parameters are selected in step B from the group comprising:
   parameters characteristic of the topography of circuits followed by the vehicles;
   parameters characteristic of the conditions of contact between the said tires and the said circuits; or
   parameters characteristic of conditions in which the vehicles are used.

3. A method according to claim 2, in which the parameters characteristic of the topography of the circuits are selected from the group comprising:
   the convexity of the surface on the tracks of the circuits;
   the incline of the tracks of the circuits;
   the incline of the bends on the tracks of the circuits; or
   significant undulations in the surface of the tracks of the circuits.

4. A method according to claims 2 or 3 in which the parameters characteristic of the conditions in which the vehicles are used in the circuits are selected from the group comprising:

bends through 180° and U turns; or
steering angle in a zone in which materials are loaded or unloaded.

5. A method according to claims 2 or 3, in which the parameters characteristic of the conditions of contact between the tires and the tracks of the circuits are selected from the group comprising:
   hardness of the surface;
   presence of aggregates;
   presence of stones;
   accidental shedding of stones;
   presence of dangerous protuberances; or
   presence of water.

6. A method according to claims 1, 2 or 3, wherein during step E the processor performs an arithmetic averaging of the variance dimensions ($\chi_i$) for the n parameters, to arrive at:

$$I = \frac{1}{n}\sum_{i=1}^{n} x_i$$

where I is a variance dimension index.

7. A method according to claims 1, 2 or 3, wherein during step E the processor performs an arithmetic averaging of the variance dimensions ($\chi_i$) with weighting by weighting factors ($f_i$) specified for each of the n parameters, to arrive at:

$$I = \frac{\sum_{i=1}^{n} x_i f_i}{\sum_{i=1}^{n} f_i}$$

where I is a variance dimension index.

8. A method according to claim 7, in which the weighting factors ($f_i$) are in the range of 0.1 and 3.

9. A method according to claim 8 wherein the weighting factors are in the range of 0.5 and 2.

10. A method according to claims 1, 2 or 3, in which the variance dimension characteristic ($\chi_i$) for each parameter has a scale of values between 1 and m, with 1 corresponding to poor operating conditions and m corresponding to the reference operating conditions for the tires.

11. A method according to claim 10, in which each parameter is assigned a weighting factor ($f_i$) and during step E the processor standardizes the consolidation value of the zone with respect to a reference situation $I_{th}$, as follows:

$$I_{th} = \frac{\sum_{i=1}^{n} mf_i}{\sum_{i=1}^{n} f_i} \text{ to arrive at } I_\% = \frac{I}{I_{th}} \times 100 = \frac{\sum_{i=1}^{n} x_i f_i}{\sum_{i=1}^{n} mf_i} \times 100$$

where I is a variance dimension index.

12. A method according to claim 10, wherein:
   1.
   2. each parameter is assigned a weighting factor ($f_i$) and for at least one of the n parameters, the processor is supplied with a reduced variance dimension ($\Delta x_i$) of the parameter, based on the concrete possibilities of reducing the variance between the conditions at a given moment and the reference operating conditions of the tires for the one parameter in the zone; and

3.

4. the processor, during step E, performs a consolidation of the reduced variance dimensions of the n parameters of the zone and arrives at PA, the index of potential reduction in the variance dimension ($\chi_i$) in the zone, and/or $PA_\%$, the relative index of potential reduction in variance in the zone, to arrive at:

$$PA = \frac{\sum_{i=1}^{n} \Delta x_i f_i}{\sum_{i=1}^{n} f_i} \text{ or } PA_\% = \frac{PA}{PA_{th}} \times 100 = \frac{\sum_{i=1}^{n} \Delta x_i f_i}{\sum_{i=1}^{n} m f_i} \times 100.$$

13. A method according to claim 12, wherein: for each parameter in the zone, the processor calculates a potential variance dimension ($x_{iA} = x_i + \Delta x_i$) for the parameter; and the processor consolidates the potential variance dimensions, weighted by weighting factors, to arrive at $I_A$, the index of potential variance in the zone.

14. A method according to claims 1, 2 or 3 in which the processor performs an additional step of comparing the variance dimension index and/or potential for reducing the variance dimensions obtained with the index and/or potentials obtained for the same zone during a previous evaluation, respectively.

15. A method according to claims 1, 2 or 3, in which the processor generates data obtained on a presentation medium.

16. A method according to claim 15, wherein data generated on a presentation medium is selected from the following:
   identification of the site by its principal parameters;
   identification of the tires in question;
   for each zone, display of the parameters selected and the variance dimensions attributed to each of these parameters;
   for each zone, display of the variance index and/or the potential for reduction and values obtained from previous measurements;
   comments on each parameter of each zone;
   recommended actions for each parameter of each zone; or
   a visual or alphanumeric display of the change in the variance index when the potential for reduced variance is applied.

17. A device for implementing the method according to claim 1 including:
   at least one access to data to be processed;
   at least one processor allowing the indices and/or potentials to be calculated; and
   operating instructions allowing the method to be performed.

18. A device according to claim 17 cooperating with means for presenting the results.

19. Software comprising elements of code programmed for implementation of the method according to claims 1, 2 or 3, when the software is installed in a medium readable by a computer system and executed thereby.

* * * * *